United States Patent
Cunningham et al.

[11] Patent Number: 5,241,910
[45] Date of Patent: Sep. 7, 1993

[54] UNIVERSAL SQUIB CONNECTOR FOR A GAS GENERATOR

[75] Inventors: Donald J. Cunningham; John E. Allard, both of North Ogden; Virginia E. Chandler, Ogden, all of Utah

[73] Assignee: Morton International, Inc., Chicago, Ill.

[21] Appl. No.: 680,979

[22] Filed: Apr. 5, 1991

[51] Int. Cl.⁵ .................. C06D 5/00; H01R 13/648
[52] U.S. Cl. .................. 102/530; 102/202.2; 102/202.3; 102/202.9; 280/741; 439/608
[58] Field of Search ............ 102/202.2, 202.3, 530, 102/531, 202.9; 280/735, 741; 439/607, 608, 620, 441, 552, 555, 557, 559, 677, 680

[56] References Cited

U.S. PATENT DOCUMENTS

| | | | |
|---|---|---|---|
| 3,093,433 | 6/1963 | Ege | 439/441 |
| 3,370,140 | 2/1968 | Betts | 102/202.2 |
| 4,319,800 | 3/1982 | Bernat | 439/736 |
| 4,374,605 | 2/1983 | Bratt | 439/608 |
| 4,378,738 | 4/1983 | Proctor et al. | 102/202.7 |
| 4,519,664 | 5/1985 | Tillotson | 439/607 |
| 4,881,463 | 11/1989 | Ninio | 102/202.2 |
| 4,943,086 | 7/1990 | Cunningham | 280/741 |
| 5,036,768 | 8/1991 | Dow et al. | 102/202.2 |
| 5,062,367 | 11/1991 | Hayashi et al. | 102/530 |

FOREIGN PATENT DOCUMENTS 363724  4/1990  European Pat. Off. ............ 439/607

Primary Examiner—Harold J. Tudor
Attorney, Agent, or Firm—Gerald K. White

[57] ABSTRACT

A universal squib connector for automobile driver and passenger air bag collision protection systems includes a ferrite bead having two holes in spaced relation with an electric terminal positioned in each hole for making electrical contact with an associated one of the protruding pins of a pin type electric squib. The arrangement enables the use of a single configuration of gas generator and a single configuration of electric initiator or squib for the igniter system of the gas generator while providing EMI/RFI protection and the advantages realizable from both pin type and pig tail type connection of the collision sensor to the input conductors or lead wires to the squib and also the electrical system of the vehicle according to the preferences of individual automobile manufacturers.

24 Claims, 4 Drawing Sheets

PRIOR ART

UNIVERSAL SQUIB CONNECTOR FOR A GAS GENERATOR

BACKGROUND OF THE INVENTION

1. Field of the Invention

The present invention relates to an electrical connector for electroexplosive ignition devices commonly known as electric initiators or squibs. Such devices may be of the bridge wire type and have particular utility in igniter devices for the actuation of collision protection systems for motor vehicle drivers and passengers.

2. Description of the Prior Art

Collision protection systems for motor vehicles, popularly known as "air bag" systems, involve the use of folded bags that typically are mounted on and fastened to the steering wheel and also to the dashboard of the vehicle and are inflated substantially instantaneously by a gas generator or inflator responsively to the onset of a collision, as sensed by a collision sensor. The sensor activates the igniter device of the gas generator by closing an electrical circuit to the bridge wire of the squib through an insulating plug provided at one end of the igniter device from a source of electrical energizing current. The plug is inserted in one end of a cylindrical steel casing that forms the outer casing for the igniter device. An explosive mixture contained in the casing surrounds the bridge wire of the squib.

Typically, the electrical energizing current to the squib is derived from the electrical system of the motor vehicle and is conducted by input conductors or lead wires, referred to hereinafter as "sensor input conductors," that are connected to the sensor and which pass through the insulating plug of the igniter device to the bridge wire and causes the bridge wire to heat to the point of disintegration. The explosive mixture in proximity to the bridge wire is thus heated and caused to be ignited. Such ignition is effective to initiate the ignition of a gas generating charge which is positioned in surrounding relation to the igniter device, resulting in the generation of a volume of gas sufficient to inflate an associated folded air bag.

A characteristic of electric squibs is that the bridge wire is susceptible of being heated and fired by extraneous radiant energy that tends to be induced in or picked up by the sensor input conductors to the squib from nearby radiation sources. Such radiant energy which may be of electomagnetic or radio frequency origin creates a hazard. Protection against such radiant energy interference is referred to hereinafter, for convenience, as "EMI/RFI protection."

A solution for overcoming this hazard proposed in the prior art involves the use of an assembly of ferrite bodies or beads internally of the squib to absorb or attenuate the extraneous energy which is induced in or picked up by the sensor input conductors to the squib, thereby preventing such energy from reaching the bridge wire, as disclosed, for example, in U.S. Pat. Nos. 3,572,247 to Theodore Warshall and in 4,306,499 to Wayne W. Holmes. In the Warshall patent the sensor input conductors extend from the plug of the squib as "pig tails," as also disclosed in FIG. 2 of the drawings hereof In the Holmes patent, which is assigned to the assignee of the present invention, electrically conducting pins protrude from the squib, to which pins the terminals of an electrical connector are made to mate. Such a "pin type" squib is also shown herein in FIG. 1 of the drawings.

Another solution for overcoming the radiant energy hazard, as embodied in the "Amphenol" connector commercially available from Amphenol Tuchel Elektronix Inc., August Hauser Str. 10, Heilbrohn, Germany, comprises an assembly including a wire coil wrapped around a cylindrical ferrite body that is connected in a series circuit with one of the input conductors or lead wires to one of the connector terminals. Such assembly in the connector for EMI/RFI protection replaces that provided internally of the igniter device in the Warshall and Holmes patents and that shown in FIG. 2 of the drawings hereof, thus simplifying the manufacture of the ingiter device as well as allowing a substantial reduction in the length thereof.

Individual preferences of motor vehicle manufacturers in regard to the type of connector, pig tail or pin type, to be used for connecting the sensor input conductors or lead wires of the squib to the electrical system of the vehicle has introduced undesirable complexity in the manufacture of gas generators. This is because some vehicle manufacturers prefer the pig tail connector while others prefer the pin type connector.

The pin type connector is a female connector that is assembled in cooperative mating relation with the protruding pins of the squib. There are various types of such connectors that are commercially available in addition to the aforementioned Amphenol connector. The Amphenol connector is difficult to permanently attach to the base of the gas generator. It includes an extended portion arranged at a right angle to the terminal portion thereof for enabling the sensor input conductors to run parallel and in close proximity to the base of the gas generator.

The pig tail connector preferred by other vehicle manufacturers, as previously mentioned, has the input conductor assembled inside the squib in cooperative relation with the elements that provide EMI/RFI protection. In this type of connector, as illustrated in FIG. 2 of the drawings, the sensor input conductors or lead wires extend out of the plug at the end of the squib as pig tails. A disadvantage with such a pig tail connector arrangement, from the standpoint of the manufacturer of the collision protection system, is that with the sensor input conductors assembled inside the squib to provide EMI/RFI protection, undesirable extension of the length of the squib results. The extension is sufficient to necessitate substantial modification in the structure of the gas generator, particularly in the structural arrangement of the base thereof, for the elongated squib to be employed therewith, as is readily apparent from a comparison of the gas generator of FIG. 2 hereof with that of FIG. 1.

It is evident, therefore, that in order to satisfy the individual preferences of the vehicle manufacturers in regard to the type of connectors to be used, the manufacturer of the collision protection system has found it necessary to provide two different configurations of squibs, two different configurations of bases for the gas generator, and two different squib assembly processes. This not only introduces undesirable complexity into the manufacture and assembly of the collision protection system but adds substantially to the cost thereof.

Thus, there is a need and a demand for an improved connector for connecting the sensor input conductors to the squib and to a source of electrical current such as the electrical system of a vehicle in order to eliminate the need for such duplication of squibs, gas generator bases, and squib assembly process while providing the necessary EMI/RFI protection and satisfying the individual preferences of the vehicle manufacturers in regard to the type of connector, pig tail or pin type, to be used.

SUMMARY OF THE INVENTION

An object of the invention is to provide a universal squib connector for vehicle driver and passenger air bag collision protection systems that enables the use of a single configuration of gas generator and a single configuration of squib for the igniter system thereof while providing the necessary and desirable EMI/RFI protection and the advantages realizable from both pin type and pig tail type connection of the collision sensor input conductors to the squib and also to the electrical system of the vehicle according to the preferences of individual vehicle manufacturers.

In accomplishing this and other objectives of the invention there is provided a universal squib connector comprising an integral connector and connector lock containing EMI/RFI protection in a region surrounding two electrical terminals that are configured and positioned to mate with the two protruding pins of a pin type electric initiator or squib. Automotive lead wires may be attached to each of the terminals by soldering or welding for transmitting electric current, which is supplied to fire the squib, with the terminals being protected from corrosion tending to result from the potential environment to which the connector may be exposed over long periods of time that may be as long as ten years or more. The two terminals are physically and electrically isolated from each other. The EMI/RFI protection that is provided is characterized in that it does not provide an electrical path between the two terminals or the two terminals and insulating material that is provided. The EMI/RFI protection is so located as to provide protection against electromagnetic interference and radio frequency interference that is extraneously induced in the terminals. The connector may be permanently secured in the proper location to the gas generator with which it is associated by suitable means which may comprise a crimp, a locking ring or a mechanical lock which spans between the connector and the socket or cavity of the generator in which the connector is mounted.

There is further provided a gas generator which may be of the type disclosed in recently issued U.S. Pat. No. 4,943,086 to Donald J. Cunningham which is assigned to the assignee of the present invention and the disclosure of which by reference is incorporated herein. Incorporated in the gas generator is a squib of the pin type wherein the pins are sealed against the environment by a glass to metal seal, and with the base of the generator having a socket or cavity into which the pins protrude and which is adapted to snugly receive and to securely retain the universal squib connector according to the invention for connecting the pins and thereby the bridge wire of the squib to sensor input conductors or automotive lead wires and thereby to a collision sensor and to an electrical energizing source such as the electrical system of the vehicle in which the collision protection system is installed.

The various features of novelty which characterize the invention are pointed out with particularity in the claims annexed to and forming a part of the specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawings which form part of the specification, in which like parts are designated by the same reference numbers, and of which.

DESCRIPTION OF THE PREFERRED EMBODIMENT

Figure 1:
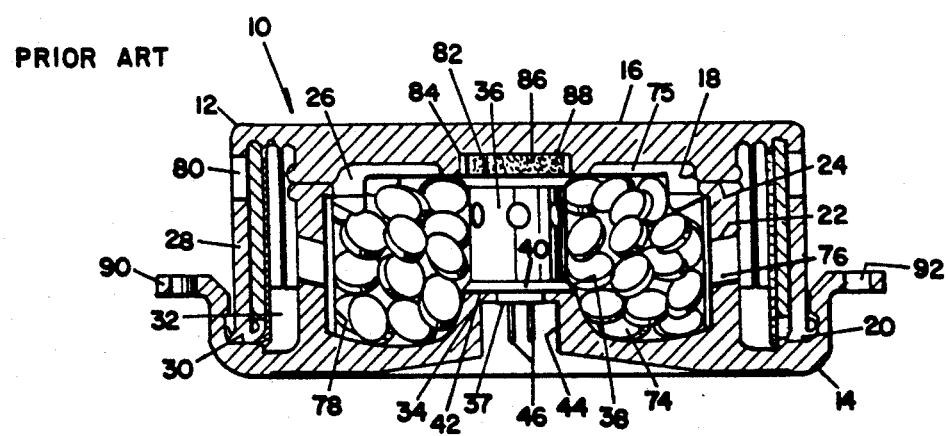
FIG. 1 is an elevation view, in cross section, illustrating a gas generator such as that disclosed in U.S. Pat. No. 4,943,086 and incorporating a squib of the pin type.

In FIG. 1 of the drawings, there is shown at 10 a gas generator which is operable when initiated to provide gas for rapidly inflating a vehicle inflatable air bag. The generator 10 has a generally cylindrical outline and includes a housing structure 12 comprising two components. These structural components comprise a lower or base component 14 and an upper component 16. Each of the components 14 and 16 may be composed of aluminum to minimize the weight of the generator. Components 14 and 16 are joined by two concentric inertia welds indicated at 18 and 20 to form the housing structure 12. Welds 18 and 20 are performed simultaneously in a single inertia welding operation.

The base 14 may be formed by forging or impact extruding and includes a cylindrical wall 22 which is mated with and is inertia welded to a circular surface 24 on the upper structural component 16 at the weld 18 to define a combustion chamber 26. The upper component 16 may be formed by forging or impact extruding and includes a cylindrical wall 28 which is concentric with wall 22 and is mated with a mating surface 30 of the base 14 and is welded by weld 20 to define an annular diffuser chamber 32 between the inner and outer walls 22 and 28, respectively, in which the gas generated by generator 10 is cooled and filtered.

The base component 14 includes, centrally thereof, an inwardly protruding post 34 on which an electric igniter system 36, including a squib 37 therein, is mounted, being retained thereon by a portion 38 of the post 34 which is crimped over a flange 40 on the lower end 42 of igniter system 36. Protruding downwardly through a central aperture 44 of the post 34 are spaced parallel pins 46 comprising electric input terminals of the squib 37 of the igniter system 36.

Figure 3:
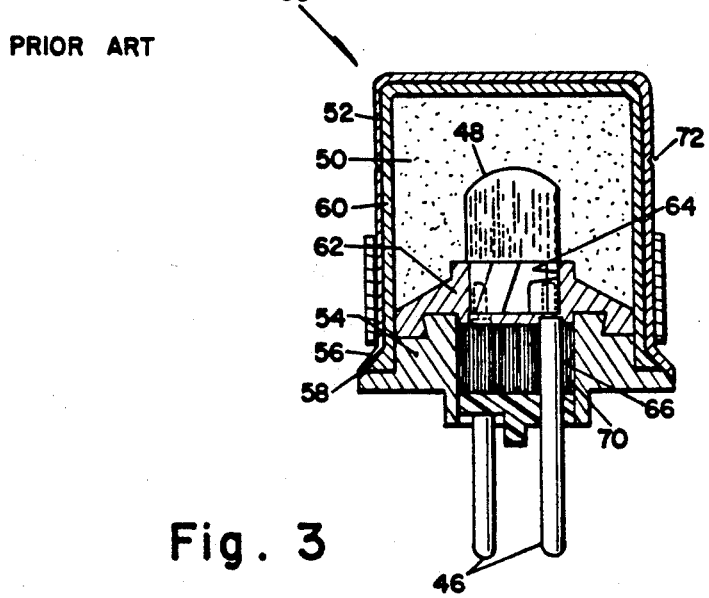
FIG. 3 is an elevation view, in cross section, of an igniter system containing a squib of the pin type that may be employed in the gas generator of FIG. 1, which igniter system is commercially available from Davey Bickford Siege Social, 37, Rue Saint-Maur, 76000 Rouen, France.
Figure 4:
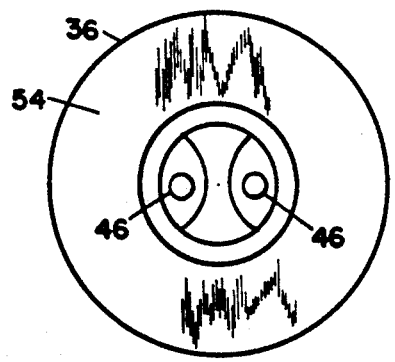
FIG. 4 shows a bottom view of the igniter system of FIG. 3.

Contained within the igniter system 36, as best seen in FIG. 3, to be ignited by electric current introduced through pins 46, is an ignition bead 48 of the squib 37 comprising a priming charge that is positioned in firing relation to a bridge wire (not shown). Surrounding the ignition bead 48 is pyrotechnic material 50 which may comprise QVB powder (quick velocity burn).

Igniter system 36 includes an outer shell 52 that may be made of steel. An insert 54 which also may be made of steel is assembled in closing and sealing relation to the lower end of shell 52, being laser welded to the flared lower end 56 thereof, as illustrated at 58. A rubber inner seal 60 is provided on the inner wall of shell 52. A plastic member 62 having a centrally located aperture 64 therein, and which is molded to the insert 54, extends between the upper end of insert 54 and the ignition bead 48. An aperture 66 is provided in the insert 54. Inwardly thereof aperture 66 is closed in sealing relation by a member 70 in the form of a glass plug that forms a glass to metal seal with the insert 54 and also with pins 46 that extend through member 70 to the bridge wire provided in the aperture 64 of plastic member 62.

Upon an initiating flow of electric current through the bridge wire of the squib 37, the ignition bead 48 is ignited and fires directly into the pyrotechnic material 50. Outer shell 52 is serrated, as illustrated at 72, for explosive separation thereby allowing the resulting hot ignition gases to expand and flow into the combustion chamber 26.

Contained within the combustion chamber 26, as shown in FIG. 1, are uniformly distributed pellets 74 of the gas generant composition, which pellets are held in place by a retainer disk 75 and are ignited for the production of inflation gas by the flow therein of ignition gases from the igniter system 36.

A plurality of apertures 76 are provided in the inner cylinder 22 around the circumference thereof for distributing the flow of gas generated in the combustion chamber 26 into the diffuser chamber 32. An aluminum foil or other suitable material (not shown) may be provided on the inner surface of cylinder 22 for hermetically sealing the combustion chamber 26 against moisture and other constituents of the environment to which the generator 10 is exposed that could tend to be deleterious to the desired operability thereof A generally cylindrical cooling and filtering screen 78 is positioned in the combustion chamber 26. The screen 78 may be positioned adjacent the aforementioned aluminum foil that is provided for forming a hermetical seal for the combustion chamber 26, and provides cooling and filtering of the generated gas prior to entry thereof into the diffuser chamber 32.

Contained within the outer cylinder 28 are a plurality of apertures or ports 80 that are spaced around the circumference thereof and through which the generated gas is directed into an air bag (not shown) that is to be inflated.

An auto ignition device 82 is disposed in a cavity 84 that is provided in the inner wall of the upper component 16, centrally thereof. The purpose of the auto ignition device is to ignite the gas generating pellets 76 and the pyrotechnic material 50, in the event of a fire while the gas generator 10 is being shipped, in storage, or installed in a vehicle, at a temperature which is lower than the ignition temperatures of pellets 72 and material 50 out which is substantially higher than the ambient temperature range to which the generator 10 normally is subjected. This prevents ignition of the pyrotechnic material 50 and 74 when, due to a fire, the generator housing is at a temperature at which the aluminum of the housing has degraded and may tend to rupture or burst. The auto ignition device 82 includes a suitable pyrotechnic material 86, a suitable gun powder, for example, enclosed in a pouch 88 shaped to fit the cavity 84 and covered by a suitable foil (not shown) such as aluminum foil.

The structural component or base 14 includes an attachment flange 90 having a plurality of apertures 92 therein spaced circumferentially thereabout for the attachment of the generator 10 to a vehicle the occupants of which are to be protected. The attachment flange 90 may be of any suitable configuration depending upon the interface requirements with the vehicle.

Functioning of the gas generator 10 begins with an electrical signal from a collision sensor (not shown) to the igniter system 36. The resulting heating of the bridge wire (not shown) to the point of disintegration fires the ignition bead 48 igniting the pyrotechnic material 50. The material 50 burns and the hot gases produced thereby tend to expand, building up pressure until the outer shell 52 of the igniter system 36 explosively separates to allow the hot gases to flow into combustion chamber 26 to ignite the gas generant pellets 74 therein The gas produced by ignition of the pellets 74 flow through the cooling and filtering screen 76 where they are initially cooled and filtered after which they burst through the combustion chamber aluminum foil seal and pass through the apertures 76 into the diffuser chamber 32. The generated gases are cooled and filtered after which they flow out of the apertures or ports 80 into an air bag for the inflation thereof.

Figure 2:
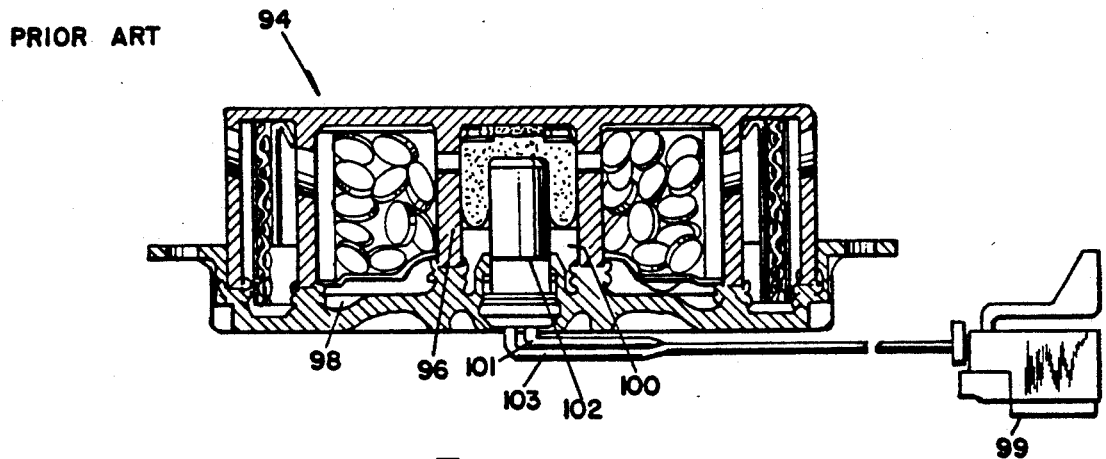
FIG. 2 is an elevation view, in cross section, illustrating a gas generator such as that disclosed in Adams et al. U.S. Pat. No. 4,561,675 and incorporating a squib of the pig tail type.

The gas generator 94 illustrated in FIG. 2 differs in a number of respects from that shown in FIG. 1 including the addition of a third internal cylinder 96 which separates the combustion chamber 98 from an ignition chamber 100 in which an electric igniter or squib 102 is contained. Additionally, as shown, the squib 102 is of the pig tail type. A wire connector shown at 99 connects input conductors 101 and 103 from the squib 102 to the electrical system of the vehicle.

Inasmuch as the gas generator 94 of FIG. 2 is disclosed and described in the aforementioned Adams et al. U.S. Pat. No. 4,561,675 and neither that gas generator nor the squib 102 of the pig tail type disclosed in FIG. 2 form part of the present invention, further detailed description thereof will not be provided herein. U.S. Pat. No. 4,561,675 is assigned to the assignee of the present invention; the disclosure thereof, by reference, is incorporated herein.

Figure 5:
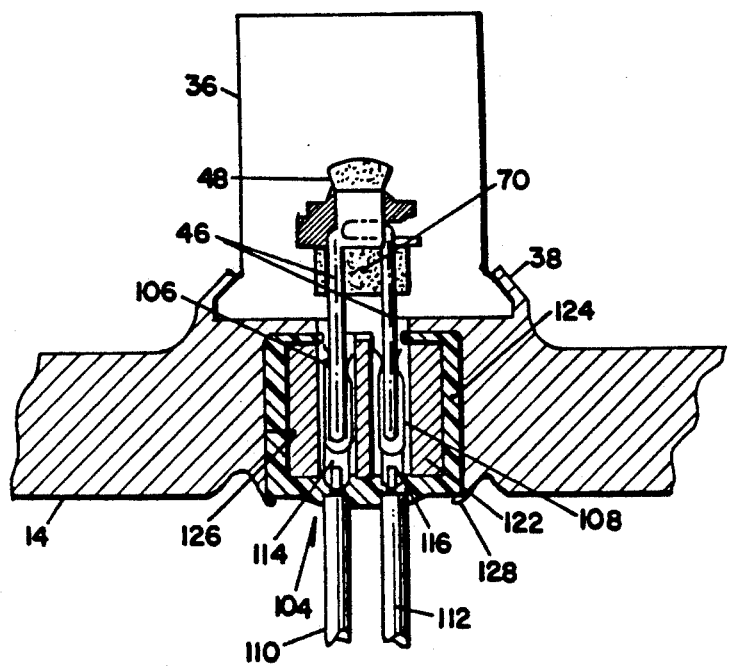
FIG. 5 is an elevation view, partly in section, showing the squib of FIG. 3 and an enlarged fragment of the base of the generator of FIG. 1 with the universal squib connector positioned in and securely retained in a socket in the generator base, and with pig tail conductors or lead wires extending downwardly from the connector.
Figure 6:
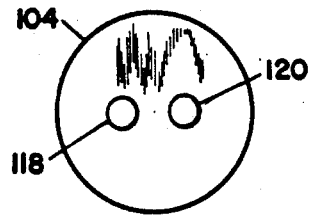
FIG. 6 is a top view of the universal squib connector showing the openings for receiving the mating pins of the squib of FIG. 5.

One embodiment of a universal squib connector incorporating EMI/RFI protection, according to the invention for providing a permanent pig tail connection to a pin type electric initiator or squib, is illustrated in FIGS. 5 and 6. As there shown, a universal squib connector 104 includes two or four contacts or terminals 106 and 108 that mate with a respectively associated one of the protruding pins 46 of the squib 37 of the igniter system 36 of FIG. 1. Automotive lead wires 110 and 112 are attached to the terminals 106 and 108, respectively. Such attachment may be by soldering, crimping and/or welding, as indicated at 114 and 116. Each terminal and associated lead wire attachment 106, 114 and 108, 116 is positioned and retained in a separate aperture or hole 118 and 120, respectively, in a ferrite bead 122, with the spacing between the holes being such as to allow mating engagement of the pins 46 with the terminals 106 and 108, as shown. The terminals 106 and 108, the lead wire attachments 114 and 116, and the ferrite bead 122 (which provides EMI/RFI protection) are encapsulated in electrical insulating material 124 which may comprise a suitable plastic with the terminals 106 and 108 physically and electrically isolated from each other. The ferrite bead 122 does not provide an electrically conductive path between the two terminals 106 and 108 or the two terminals 106 and 108 and the insulating material 124. The ferrite bead 122 provides protection from electromagnetic and radio frequency interference that may tend to be extraneously induced in the terminals 106 and 108.

The universal squib connector 104 may be firmly secured in a socket or cavity 126 that is provided in the base component 14 of the generator 10 by any suitable means which, as shown in FIG. 5, may comprise a crimp 128.

Figure 8:
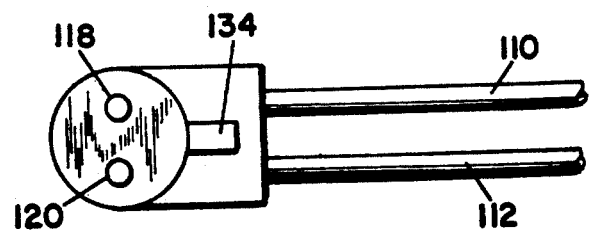
FIG. 8 is a top view of the connector of FIG. 6 showing an anti-rotation rib and also the openings into which the pins of the squib are received.
Figure 7:
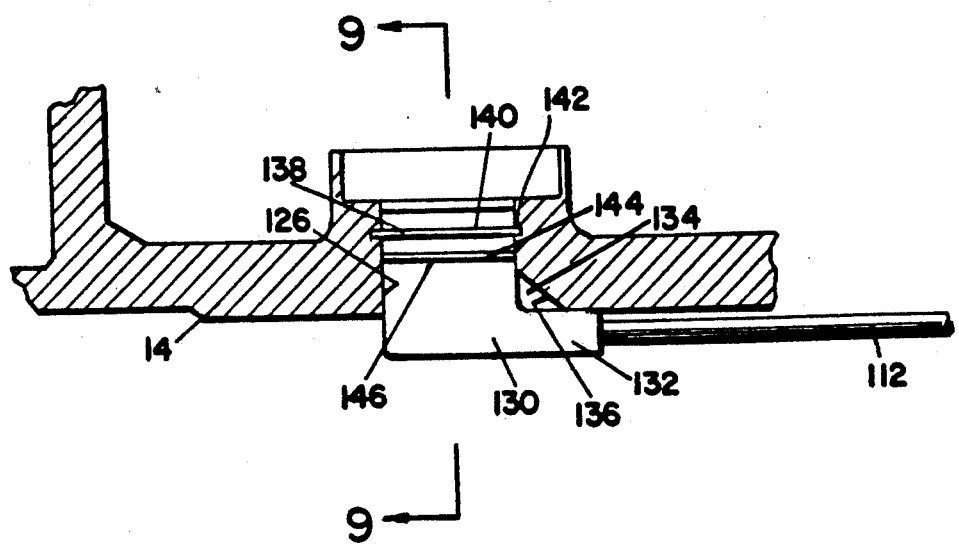
FIG. 7 is an elevation view, partly in section, illustrating a modification of the universal squib connector of FIG. 5 for enabling the pig tail conductors or lead wires to extend at a right angle to the connector parallel to the bottom surface of the generator base, and incorporating locking and anti-rotation features.
Figure 9:
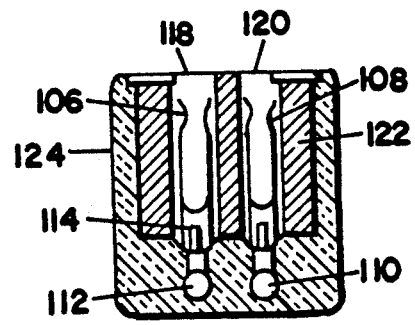
FIG. 9 is a cross sectional elevational view of the universal squib connector modification taken along the lines 9—9 of FIG. 7.

Another embodiment of the universal squib connector according to the invention, indicated by the reference numeral 130, is illustrated in FIGS. 7, 8 and 9. The universal squib connector 130 differs from that shown in FIGS. 5 and 6 in several respects Specifically, as shown, the length of the connector 130 is extended sufficiently to allow the automotive lead wires 110 and 112 to be bent through an angle of 90° to run parallel and in close proximity to the base component 14 of the gas generator 10. To this end, the connector 130 includes a portion 132 at the outer end that extends at a right angle thereto for determining the direction in which the lead wires emerge therefrom. In addition, the portion 132 is provided with an anti-rotation rib 134. The rib 134, in cooperation with a cutout 136 in the outer end of socket 126 of base component 14, permits insertion of the connector 130 into the socket 126 in cooperative engagement with the pins 46 of the squib 37 in one angular position only, thereby determining the orientation of the universal squib connector 130 with respect to the base component 14 and squib 37 of the gas generator 10. To that end the cutout 136 matches the geometrical configuration of the rib 134. Additionally, the rib 134 prevents rotation of the squib 37 and of connector 104 in socket 126 relatively to the base component 14.

For the retention of the universal squib connector 130 in the socket 126, there is provided an expansible locking means or ring 138 that may be made of steel or other suitable material and is positioned in a groove 140 in the outer surface of the universal squib connector 130. When the connector 130 is properly fully inserted in the socket 126, the locking ring 138 expands out of the groove 140 into locking relation with a groove 142 provided on the interior wall of the socket 126 thereby to retain the connector 130 in the socket 126 with each of the terminals 106 and 108 in engagement with a respectively associated pin 46 of the squib 37. Desirably, a rubber sealing ring 144 positioned in a groove 146 on the outer surface of the connector 130 may be provided for sealing the terminals 106 and 108 from the external environment.

Figure 11:
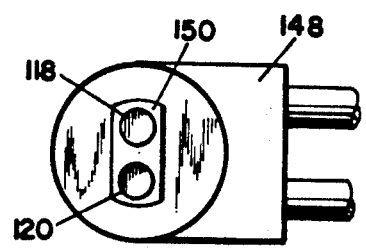
FIG. 11 is a top view of the universal squib connector of FIG. 10.
Figure 10:
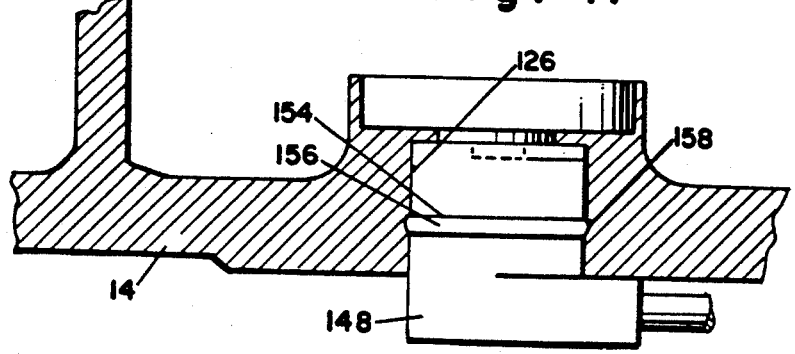
FIG. 10 is an elevation view, partly in section, illustrating a modification of the universal squib connector of FIG. 7.

A further embodiment of the universal squib connector according to the invention, indicated by the reference numeral 148, is illustrated in FIGS. 10 and 11. The connector 148 differs from the connector 130 shown in FIGS. 7 and 8 in that the anti-rotation rib 136 has been eliminated and a generally rectangular cavity or groove 150 has been provided instead. Elimination of the anti-rotation rib 136 on the universal squib connector makes unnecessary the formation of the cutout 136 in the wall of the socket 126 in the base component 14 of the gas generator 10.

Cavity 150, as shown, adjoins in a symmetrical manner the apertures or holes 118 and 120 that receive the mating pins 46 of the squib of the gas generator 10.

Figure 12:
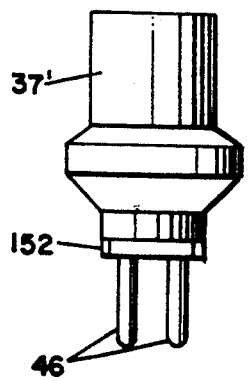
FIGS. 12, 13 and 14 are elevation, side and bottom views, respectively, illustrating a modification of the base of the squib used with the universal squib connector of FIGS. 10 and 11.
Figure 14:
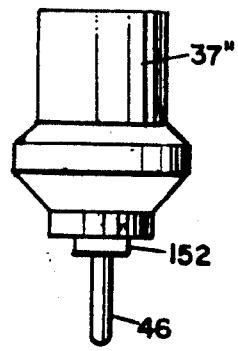
Figure 13:
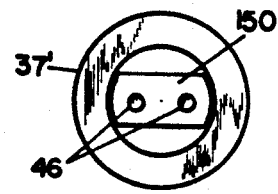

The squib provided for use with the universal squib connector 148, as indicated at 37' in FIGS. 12, 13 and 14, includes a projection or projecting part 152 on the base thereof. The projection 152 extends in the direction of the pins 46, being positioned symmetrically with respect thereto, and is disposed to fit into the groove 150. The contour or configuration of the projection 152 matches that of the cavity 150, being slightly smaller, however, to allow easy insertion of the projection 152 into the cavity 150 as the universal squib connector 148 is positioned in the socket 126 of the base component 14 of the gas generator 10. The projection 152 permits such positioning of the connector 148 in socket 126 in two angular positions that are spaced 180° apart.

It will be understood that, if desired, the contours of the cavity 150 and the projection 152 may be such that there is only one angular position in which the projection 152 will fit in the cavity 150, and hence, only one angular position in which the universal squib connector 148 properly may be fully inserted into the socket 126. Whether arranged to permit one or two angular positions, and hence, predetermined oriented positions of the universal squib connector squib 148 with respect to the squib 37' and gas generator 10, it will be apparent that the cavity 150 and projection 152 preclude any relative angular movement between the squib 37' and the universal squib connector 148. This prevents angular forces or torques to which the universal squib connector 148 might be subjected from being transmitted directly to the protruding pins 46 possibly resulting in damage to the squib 37'. It is noted that this advantageous feature is also inherent in the universal squib embodiment 130 of FIGS. 7-9.

For the retention of the universal squib connector 148 in the socket 126, there is provided a first circumferential groove 154 on the outer cylindrical surface of the connector 148 and an expansible locking ring 156 that may be made of steel or other suitable material, which locking ring may be positioned in the groove 154. When the connector 148 is fully inserted in socket 126 with the projection 152 in proper cooperative and fitting relation with the cavity 150, the locking ring 156 expands out of the groove 154 into locking relation with a second circumferential groove 158 that may be provided on the interior wall of the socket 126 thereby to retain the connector 148 in the socket 126 with each of the terminals 106 and 108 in engagement with a respectively associated pin 46 of the squib 37'. Such cooperative relation of locking ring 156 and groove 158 on the interior wall of the socket 126 may be substantially identical to that of the locking ring 138 and groove 140 as shown in FIG. 7. If desired, a rubber sealing ring similar to the sealing ring 144 of FIG. 7 may be positioned in a groove on the outer cylindrical surface of the universal squib connector 148 for sealing the terminals 106 and 108 from the external environment.

As those skilled in the art will understand, the cavity 150 provided in the universal squib connector 148 may be disposed non-symmetrically, if desired, with respect to the holes 118 and 120 that receive the protruding pins of the squib 37'. In such modification the projection 152 on the base of the squib 37' would be similarly positioned non-symmetrically with respect to the protruding pins 46, with the contour of the projection 152 matching that of the cavity 150 in the universal squib connector 148.

It is contemplated herein that, in such modification, the cavity 150 may be positioned in either contact or non-contact relation with the holes 118 and 120 of the universal squib connector, and similarly, that the projection 152 on the squib may be positioned in either contact with or non-contact with the protruding pins 46. Thus, as used herein, the terms "adjoin" and "adjoining" are used in a broad sense to mean either "lying next to and in contact" or "lying next to and not in contact."

For the vehicle manufacturer that prefers a pin type connector, a universal squib connector 104, 130 or 148, according to the invention, may be provided separately from the gas generator 10 with which it is to be associated and which incorporates a squib 37 or 37' having protruding pins 46. Such vehicle manufacturer may then assemble the appropriate universal squib connector to the generator 10, inserting it in the socket 126 with the terminals 106 and 108 thereof in proper engagement with the pins 46 of the squib 37 and providing a crimp 128 to firmly secure the connector in place if of the first embodiment illustrated and designated by reference numeral 104; and if of an alternative embodiment designated 130 or 148, simply inserting the connector in the socket 126 and locking it in place by means of the locking ring 138 or 156 and the associated groove in the wall of socket 126.

For the vehicle manufacturer that prefers a pig tail connector, the universal squib connector, whether of the embodiment designated 104, 130 or 148, may be assembled with an associated gas generator 10 incorporating an appropriate squib of the pin type by the manufacturer of the collision protection system, with the universal squib connector 104, 130 or 148 firmly secured in place in the socket 126 of the generator 10 and with the terminals 106 and 108 thereof in proper engagement with the terminals 106 and 108 of the associated squib 37 or 37'.

Thus, in accordance with the invention, there has been provided a universal squib connector for vehicle driver and passenger air bag collision protection systems that enables the use of a single configuration of gas generator and a single configuration of squib for the igniter system of the gas generator while providing the necessary and desirable EMI/RFI protection and the advantages realizable from both pin type and pig tail type connection of the collision sensor input conductors or lead wires to the squib and also the electrical system for the vehicle according to the preferences of individual vehicle manufacturers.

The universal squib connector is characterized in comprising an integral connector and connector lock containing, that is, incorporating EMI/RFI protection in a region surrounding two electrical terminals that are configured to mate with and make electrical engagement with the protruding pins of a pin type electric initiator or squib. A feature of the connector is that the terminals are protected from corrosion tending to result from exposure to the environment in which the connector is expected to be operative over long periods of time, with the terminals physically and electrically isolated from each other.

With this description of the invention in detail, those skilled in the art will appreciate that modifications may be made to the invention without departing from the spirit thereof. Therefore, it is not intended that the scope of the invention be limited to the specific embodiments that have been illustrated and described. Rather, it is intended that the scope of the invention be determined by the scope of the appended claims.

What is claimed is:

1. A universal squib connector for providing a permanent pig tail connection to a pin type electric initiator or squib comprising,
   connecting terminals,
   a ferrite bead having holes therethrough in spaced relation, each of said holes having a first end and a second end, with one of said terminals positioned in one of said holes and another of said terminals positioned in another of said holes, the spacing of said holes being such as to allow each of the protruding pins of a pin type electric initiator or squib to enter the first end of an individually associated one of said holes to make electrical contact with an individually associated one of said terminals, said ferrite bead providing EMI/RFI protection in a region surrounding said terminals, and
   a plurality of electrical input conductors for connecting an electrical circuit to the electric initiator or squib with each of said input conductors having an end positioned in the second end of an associated one of said holes in said ferrite bead and connected to the terminal positioned therein.

2. A universal squib connector as defined by claim 1 and further including means connecting said ferrite bead to the pin type electric initiator or squib to permanently retain each of said terminals in electric contact with the individually associated one of the protruding pins of the electric initiator.

3. A universal squib connector as defined by claim 1, wherein said ferrite bead and said terminals are encapsulated in a plastic molding with the holes in said ferrite bead extending through the plastic molding to allow entry of each of the protruding pins of an electric squib to enter the associated first end thereof and an end of each of said electrical conductors to enter the associated second end thereof.

4. A universal squib connector in combination with a gas generator having an electric initiator or squib of the pin type with protruding pins and operative when electrically energized to provide ignition for said gas generator, said universal squib connector providing a permanent pig tail connection to said pin type squib and comprising, connecting terminals, a ferrite bead having holes therethrough in spaced relation, each of said holes having a first end and a second end, with one of said terminals positioned in one of said holes and another of said terminals positioned in another of said holes, the spacing of said holes being such as to allow each of the protruding pins of said squib to enter the first end of an individually associated one of said holes to make electrical contact with an individually associated one of said terminals, said ferrite bead providing EMI/RFI protection in a region surrounding said terminals, and a plurality of electrical input conductors for connecting an electrical circuit to said squib with each of said input conductors having an end positioned in the second end of an associated one of said holes in said ferrite bead and connected to the terminal positioned therein, wherein said ferrite bead and said terminals are encapsulated in a plastic molding with the holes in said ferrite bead extending through the plastic molding to allow entry of each of the protruding pins of said squib to enter the associated first end thereof and an end of each of said electrical conductors to enter the associated second end thereof, said gas generator having an external wall portion with a socket formed therein into which the protruding pins of said squib extend, with the shape of the plastic molding of said universal squib connector matching that of said socket whereby said universal squib connector is insertable in said socket with each of the terminals in electric contact with an individually associated protruding pin of said squib, and further including means to permanently retain said universal squib connector in said socket.

5. A universal squib connector as defined in claim 4 wherein the means to permanently retain said universal squib connector in said socket is a crimp formed in the wall portion of the generator.

6. A universal squib connector as defined by claim 4 wherein the plurality of electrical input conductors extend directly away from said universal squib connector.

7. A universal squib connector as defined by claim 4 wherein the shape of said universal squib connector and that of said socket in the external wall portion of the gas generator are both cylindrical, and wherein the means to permanently retain said universal squib connector in said socket in the external wall portion of said generator comprises a first circumferential groove in the connector, an expansible locking ring in said first circumferential groove, and a second circumferential groove in the wall of the socket with the positions of said first and second circumferential grooves on said connector and socket, respectively, being such that said first and second circumferential grooves are positioned adjacent each other when said universal squib connector is substantially fully inserted in said socket whereby the locking ring is allowed to expand partially out of said first circumferential groove into said second circumferential groove thereby to lock said universal squib connector in said socket.

8. A universal squib connector as defined by claim 7 further including a seal ring provided in circumferential relation to said connector and positioned between said connector and the interior wall of the socket.

9. A universal squib connector as defined by claim 7 wherein the plastic molding for said universal squib connector includes a portion that is adjacent the electrical input conductors, which portion extends at a right angle to said universal squib connector to guide and allow the electrical input conductors to run parallel to the external wall of the generator in which the socket is formed.

10. A universal squib connector as defined by claim 9 wherein an anti-rotation rib is provided on the universal squib connector, which rib extends between said connector and the right angle portion thereof, wherein the wall of said socket in the external wall portion of the gas generator includes a cutout portion matching the configuration of said anti-rotation rib, and wherein said anti-rotation rib is so arranged as to fit in the matching cutout portion in the wall of said socket when each of the protruding pins of said squib are in operable electrical contact with an associated one of said terminals.

11. A universal squib connector as defined by claim 9 further including anti-rotation means comprising a cavity adjoining the holes that are provided for the insertion therein of the protruding pins of an electric squib with which the universal squib connector is to be used, which cavity is arranged to receive a projection on the electric squib when the universal squib connector is brought into operative relation with the electric squib, with the contour of the cavity matching that of the projection on the electric squib.

12. A gas generator comprising:

a housing having a wall provided with outer orifices, in which wall a socket is formed, and including, a pin type squib having electrically conducting pins protruding from a portion thereof, an inner central chamber in which is placed said squib for ignition, said squib being positioned such that said pins thereof extend into said socket, an intermediate chamber containing a gas generant pyrotechnic composition, an outer chamber containing means for filtering and for communicating externally of the housing by way of said outer orifices, with at least said intermediate and outer chambers communicating through intermediate orifices, a universal squib connector for connecting said squib to a source of electrical current for initiating ignition, said universal squib connector being positioned in said socket and including holes therein into which said pins from said squib are received, said universal squib connector providing a permanent pig tail connection to said squib and comprising, connecting terminals, a ferrite bead having said holes therethrough in a spaced relationship, each of said holes having a first end and a second end, with one of said terminals positioned in one of said holes and another of said terminals positioned in another of said holes, the spacing of said holes being such as to allow each of the protruding pins of said squib to enter the first end of an individually associated one of said holes to make electrical contact with an individually associated one of said terminals, said ferrite bead providing EMI/RFI protection in a region surrounding said terminals, and a plurality of electrical input conductors providing a pig tail connection for connecting an electrical circuit to said squib with each of said input conductors having an end positioned in the second end of an associated one of said holes in said ferrite bead and connected to the terminal positioned therein.

13. A gas generator as defined by claim 12 further including means to permanently retain said universal squib connector in said socket and thereby to permanently retain each of said terminals in electric contact with an individually associated one of the protruding pins of said squib.

14. A gas generator as defined by claim 13 wherein said means to permanently retain said universal squib connector in said socket comprises a crimp in the wall of said housing.

15. A gas generator as defined by claim 13 wherein the shape of said universal squib connector and that of said socket in the wall of the gas generator are both cylindrical, and wherein the means to permanently retain said universal squib connector in said socket in the wall of said generator comprises a first circumferential groove in said universal squib connector, an expansible locking ring in said first circumferential groove, and a second circumferential groove in the wall of the socket, with the positions of said first and second circumferential grooves, respectively, being such that said first and second circumferential grooves are positioned adjacent each other when said universal squib connector is positioned in operable relation with said squib in said socket whereby said locking ring is allowed to expand partially out of said first circumferential groove into said second circumferential groove thereby to lock said universal squib connector in said socket.

16. A gas generator as defined by claim 15 further including seal means provided between said universal squib connector and the interior wall of said socket.

17. A gas generator as defined by claim 13 wherein said ferrite bead and said terminals are encapsulated in a plastic molding with the holes in said ferrite bead extending through the plastic molding to allow entry of each of the protruding pins of said squib to enter the associated first end thereof and an end of each of said pair of electrical input conductors to enter the associated second end thereof, and wherein the plastic molding includes a portion adjacent said pair of electrical input conductors that extend at a right angle to said universal squib connector to guide and allow said electrical input conductors to run parallel to the wall of the generator in which the socket is formed.

18. A gas generator as defined by claim 13 further including anti-rotation means provided in cooperative relation with said universal squib connector and said gas generator to predetermine the angular orientation of said universal squib connector with respect to that of said gas generator and to prevent relative angular movement between said universal squib connector and said squib.

19. A gas generator as defined by claim 18 wherein said anti-rotation means comprises a rib provided on said universal squib connector and a cutout in the inner wall of said socket which is arranged to receive said rib when said universal squib connector is positioned in said socket in operable relation with said squib.

20. A gas generator as defined by claim 18 wherein said anti-rotation means comprises a cavity adjoining said holes in said universal squib connector and a projection on said squib with said projection matching the configuration or said cavity and arranged to fit therein when said universal squib connector is positioned in said socket in operable relation with said squib.

21. A gas generator as defined by claim 17 further including anti-rotation means provided in cooperative relation with said universal squib connector and said gas generator to predetermine the angular orientation of said universal squib connector with respect to that of said gas generator and to prevent relative angular movement between said universal squib connector and said squib.

22. A gas generator as defined by claim 21 wherein said anti-rotation means comprises a rib provided on said universal squib connector and a cutout in the inner wall of said socket which is arranged to receive said rib when said universal squib connector is positioned in said socket in operable relation with said squib.

23. A gas generator as defined by claim 21 wherein said anti-rotation means comprises a cavity adjoining said holes in said universal squib connector and a projection on said squib with said projection on said squib matching the configuration or said cavity and arranged to fit therein when said universal squib connector is positioned in said socket in operable relation with said squib.

24. A gas generator as defined by claim 15 wherein said ferrite bead and said terminals are encapsulated in a plastic molding with the holes in said ferrite bead extending through the plastic molding to allow entry of each of the protruding pins of said squib to enter the associated first end thereof and an end of each of said pair of electrical input conductors to enter the associated second end thereof, and wherein the plastic molding includes a portion adjacent said pair of electrical input conductors that extend at a right angle to said universal squib connector to guide and allow said electrical input conductors to run parallel to the wall of the generator in which the socket is formed.

* * * * *

UNITED STATES PATENT AND TRADEMARK OFFICE
CERTIFICATE OF CORRECTION

PATENT NO. : 5,241,910
DATED : September 7, 1993
INVENTOR(S) : Cunningham et al.

It is certified that error appears in the above-identified patent and that said Letters Patent is hereby corrected as shown below:

At column 1, line 61, "Theodore Warshall" should be underscored.

At column 1, line 62, "Wayne W. Holmes" should be underscored.

At column 1, line 5, "hereof" should be -- hereof. --.

At column 3, line 50, "Donald J. Cunningham" should be underscored.

At column 4, line 16, "Adams et al." should be underscored.

At column 6, line 4, "thereof" should be -- thereof. --.

At column 6, line 21, "76" should be -- 72 --.

At column 6, line 3, "therein" should be -- therein. --.

At column 7, lines 4-5, "Adams et al." should be underscored.

Signed and Sealed this

Thirteenth Day of September, 1994

Attest:

BRUCE LEHMAN

Attesting Officer

Commissioner of Patents and Trademarks